United States Patent [19]

Yokotani et al.

[11] Patent Number: 4,586,972
[45] Date of Patent: May 6, 1986

[54] METHOD FOR MAKING MULTILAYER CERAMIC BODY

[75] Inventors: Yoichirou Yokotani, Ibaraki; Junichi Kato; Masamitsu Nishida, both of Osaka; Hiromu Ouchi, Toyonaka; Tsuneharu Nitta, Katano, all of Japan

[73] Assignee: Matsushita Electric Industrial Co., Ltd., Kadoma, Japan

[21] Appl. No.: 596,591

[22] Filed: Apr. 4, 1984

[30] Foreign Application Priority Data

Apr. 5, 1983 [JP] Japan .................................. 58-60203
Oct. 15, 1983 [JP] Japan ................................ 58-191673

[51] Int. Cl.$^4$ ...................... B32B 31/26; C04B 37/00
[52] U.S. Cl. ...................................... 156/89; 29/25.41; 29/25.42
[58] Field of Search .............. 156/89; 29/25.41, 25.42; 361/312, 313, 320, 323

[56] References Cited

U.S. PATENT DOCUMENTS

| | | | |
|---|---|---|---|
| 3,612,963 | 10/1971 | Piper et al. | 29/25.42 |
| 3,785,895 | 1/1974 | Ettre et al. | 156/89 |
| 3,948,706 | 4/1976 | Schmeckenbecher | 156/89 |
| 4,082,906 | 4/1978 | Amin et al. | 156/89 |

Primary Examiner—Caleb Weston
Attorney, Agent, or Firm—Cushman, Darby & Cushman

[57] ABSTRACT

Plural number of thermo-plastic organic films having ceramic green layer(s) and a layer to become electrode thereon are laminated, thereby to form laminated body, which is hot-pressed to impregnate the organic film substance into the ceramic green layers and into layers to become electrodes, and then is fired; thereby, the ceramic layers are formed very thin, thereby producing a capacitor of large capacitance per volume.

4 Claims, 10 Drawing Figures

4,586,972

METHOD FOR MAKING MULTILAYER CERAMIC BODY

BACKGROUND OF THE INVENTION

1. Field of the Invention

The present invention relates generally to a manufacturing method of a multilayer ceramic body, and more particularly concerns a novel method for providing thin layers in multilayer ceramic body.

2. Description of the Prior Art

Ceramic laminated body made by laminating ceramic green layer with electrode layers inbetween and subsequent firing has been used for laminated ceramic capacitor and ceramic multilayered printed circuit substrate. Among the above-mentioned ones, for instance, in multilayered ceramic capacitor, recently miniaturization and increase of capacitance become strong demand. Therefore, increasing of capacitance of capacitor is intended by decreasing thickness of ceramic layers between electrodes besides intensive developing of high electric constant material. Furthermore, it is also intended for ceramic multilayer printed circuit substrate, wiring with more layers and higher density are sought for by making thickness of each ceramic layeres to be laminated thinner. As above-mentioned, there is a great demand to decrease thickness of each ceramic layer of the ceramic laminated body.

One example of the conventional method of manufacturing laminated ceramic body is disclosed in the U.S. Pat. No. 3,612,963 as follows: Firstly, a ceramic green layer is formed on an organic film, and thereon, an electrode layer is formed by printing process or the like. Nextly, the organic film is peeled off from the ceramic green layer, thereby leaving the ceramic green layer with electrode layer thereon. A number of composite ceramic green layers having the electrode layer thereon are laminated and the laminated body is hot-pressed, thereby to tightly bonding the laminated layers. And after carrying out some working thereon, the the laminated body is fired. In the conventional process, when the thickness of the ceramic green layer is thin, the strength of the green layer becomes weak, and the ceramic green layer is likely to be broken when peeling off the organic film or when laminating the ceramic green layers, thereby making the manufacturing difficult. As a result of above-mentioned problem, thickness per one layer of the ceramic laminated body can not be thinner than 30 $\mu$m for the ceramic green layer before the firing, and than 20 $\mu$m even after the firing.

SUMMARY OF THE INVENTION

Purpose of the present invention is to provide a method for making multilayer ceramic body capable of making ceramic laminated body wherein thickness per one ceramic layer is thinner than the conventional ones. The present invention also provides a method for easy handling of very thin ceramic green layer in manufacturing.

Method for making multilayer ceramic body in accordance with the present invention comprises steps of:

(a) forming at least a ceramic green layer on an organic film having thermo-plasticity, (b) printing at least one layer to become electrode layer of a predetermined pattern on one of the ceramic green layer and the organic film, (c) laminating a plurality of the organic films having the ceramic green layers and the layer to become electrode, for producing a laminated body, wherein each of the layer to become electrode is disposed between adjacent layers of the multilayer body, (d) hot-pressing the laminated body, thereby to melt the organic films to impregnate into the ceramic green layers and the layers to become electrode, and (e) sintering the laminated body thereby to make a multilayer ceramic body having plural electrode layers disposed parallel with predetermined gaps inbetween.

DESCRIPTION OF THE PREFERRED EMBODIMENTS

Figure 1A:
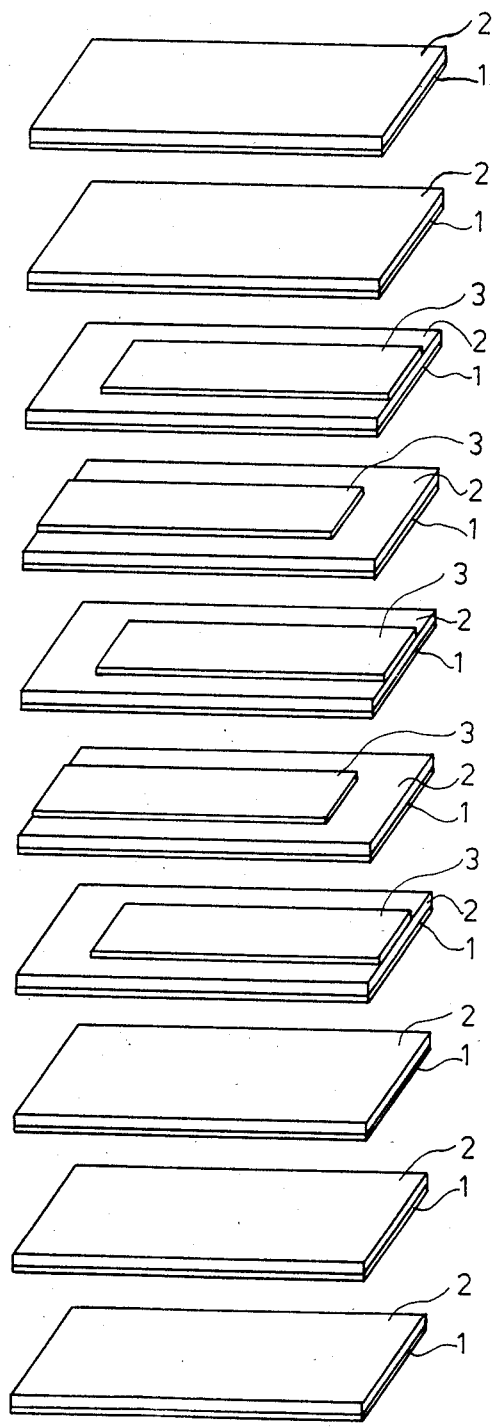
FIG. 1(a) is an exploded perspective view of a ceramic laminated capacitor to be manufactured embodying the present invention.
Figure 1:
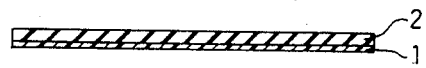
FIG. 1(b) and FIG. 1(c) are sectional side views of the component composite sheets for use in making the capacitor of FIG. 1(a).
FIG. 1(d) is a sectional side view of a laminated body of the ceramic green layers made by the component of FIG. 1(a).
FIG. 1(e) is a sectional side view of a completed capacitor manufactured by embodying steps shown in FIGS. 1(a) through 1(d).
Figure 1:
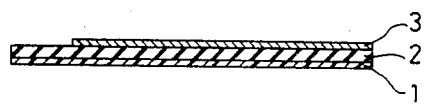
Figure 1:
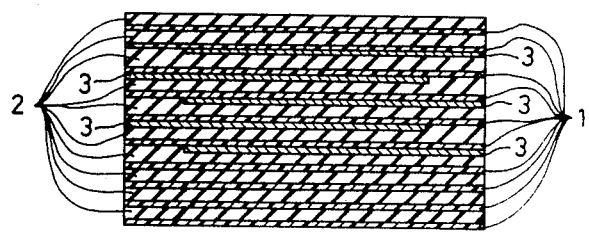
Figure 1:
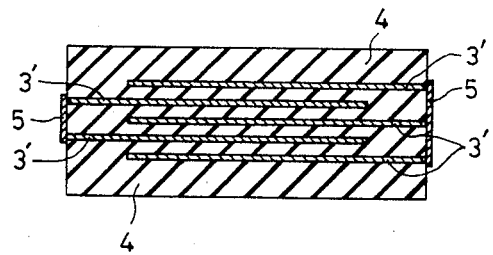

The method in accordance with the present invention can be regarded to comprise the following three elementary parts:

(a) A step of forming at least one ceramic green layer on a thermo-plastic organic film, and further forming a layer to become an electrode after firing on at least one of the ceramic green layer, thereby forming a composite sheet, and laminating at least two of the composite sheets to make a laminated body, (b) hot-pressing the laminated body so that the organic film material is melted to impregnate the ceramic green layer and the layer to become the electrode therewith, and also to bind the ceramic green layer and the layer to become the electrode thereby, and (c) firing the melted and bonded body comprising the ceramic green layer and the layers to become electrode.

According to the method for making multilayer ceramic body in accordance with the present invention, since ceramic green layers formed on the organic films are laminated with the organic film thereon, the strength of the ceramic green layers is larger than the conventional method wherein ceramic green layers from which the organic film substrates are peeled off, are laminated. Therefore, the present invention enables to handle very thin ceramic green layers and can achieve a very high production yield in mass-production of the multilayered ceramic body.

In the part (b), by impregnation of the organic film material into the ceramic green layers and layers to become electrode by the hot-pressing, the ceramic green layers and the layers to become electrode can directly be bonded each other.

Accordingly, in the part (c), the laminated body does not peel off in faces where the organic films existed, or undesirable foams are not left in the interface part between the layers, so that a very compact and tightly bonded multilayered ceramic body is obtainable.

The organic film to form ceramic green layer may be polyethyleneterephthalate film or other thermo-plastic organic films such as polyethylene resins or polyvinyl chloride resins. Anyway, the organic films can be of any materials which disappears at firing. For the organic film, those having thickness of from 0.5 $\mu$m to 10 $\mu$m is suitable. Under thickness of 0.5 $\mu$m, the strength as substrate is insufficient for supporting the ceramic green layer. A thickness of above 10 $\mu$m induces leaving of the organic film as a result of over impregnation of the organic film material in the ceramic green layers and layers to become electrode, leading to liability of peeling off in the multilayered ceramic body or undesirable leaving of foams in the interface parts, resulting in poor strength of the multilayered ceramic body.

Temperature in heating for impregnation of the organic films into the ceramic green layers and layeres to become the electrode should be made at a temperature which is between a temperature lower than melting point of the organic film by 50° C. and a temperature higher than the melting point by 100° C. When the heating temperature is below this range, the impregnation does not advance sufficiently, and at a temperature above this range the organic film material is likely to decompose thereby lowering density of the ceramic green layer and hinder sufficient sintering.

Pressing force during the impregnation process should be in such a range that the ceramic green layer does not make too much plastic deformation.

Forming of the ceramic green layer(s) on the organic film can be made by doctor blade method, roll coat method, gravure printing method or the like.

The above-mentioned impregnation of the organic film can be made by hot-press method using heated metal press, or alternatively, a pressing by rolling under heating may be usable.

In forming the layers to become electrode, it is preferable that the layers to become electrode is a layer which becomes electrode by sintering. By selecting such layer as the layer to become electrode, undesirable impregnation of the printing ink as the layers to become electrode into the ceramic green layer is prevented. In such method, since the solvent in the printing ink to form the electrode is vaporized on the organic film, the layers to become electrode can be formed extremely smoothly. And moreover, the once-dried layers of printing ink as the layer to become electrode does hardly impregnate into the ceramic green layer during the subsequent laminating step. Accordingly, the electrode layer in the multilayered ceramic body obtained by firing the laminated body become extremely even and smooth layer, and undesirable impregnation of material of electrode into the ceramic layers can be prevented, and therefore insufficient insulation and insufficient break down voltage are eliminated.

As a result of the above-mentioned features, the method in accordance with the present invention enables handling of thinner ceramic green layer than the conventional method, by adoption of laminating ceramic green layers with organic film substrate left thereon. Besides, by impregnating the thermo-plastic organic film into neighboring ceramic green layer and the layer to become electrode by the hot-pressing and by resultant achievement of tight bonding of the neighboring ceramic green layers and layers to become electrode each other, undesirable peeling off of the multilayered ceramic body after firing at the bonding interface or undesirable leaving of foams at the interface parts are eliminated. As a result of the above-mentioned reason, a multilayered ceramic body comprising very thin ceramic elementary layers is easily obtainable.

Furthermore, when a layer to become electrode is formed by printing method on one face of the organic film, which has a ceramic green layer on the opposite face of the organic film, a very low impregnation of the electrode material into the ceramic layer is attainable. Accordingly, poor insulation between the electrodes and poor break down voltage are prevented, thereby enabling to provide multilayered ceramic body with extremely thin ceramic layers with stable and good manufacturing yield.

A first preferred embodiment is described with reference to FIG. 1(a), FIG. 1(b), FIG. 1(c), FIG. 1(d) and FIG. 1(e). As shown in FIG. 1(a) which is an exploded perspective view of the laminated body before hot-pressing process, numeral 1 designates polyethyleneterephthalate thermo-plastic film of about 2 $\mu$m thickness, whereon about 10 $\mu$m thickness ceramic green layer 2 is formed by doctor blade method as shown in FIG. 1(b). Two sets of such composite sheet consisting of the polyethyleneterephthalate film 1 and the ceramic green layer 2 are used in the upper part and three sets of the composite sheet are used in the lower part. And in the inbetween part, three of the below-mentioned three-layer composite sheet shown in FIG. 1(c) are used. Each of the three-layer composite sheet is made by forming a ceramic green layer 2 of about 10 $\mu$m thickness by doctor blade method on a polyethyleneterephthalate film 1 of about 2 $\mu$m, and further on the ceramic green layer 2 a layer 3 to become electrode is formed by known printing method such as gravure printing method to a thickness of about 3 $\mu$m. The printing is made in such a pattern as shown in FIG. 1(a), that is, the layer 3 to become the electrode is printed with margins on three sides thereof and only one side of the layer 3 is extended to an edge of the polyethyleneterephthalate film 1 and the overriding ceramic green layer 2, so that resultant electrode can be connected at the edge. And no-margin-sides on the three-layer composite sheets are disposed alternatively at right and left sides of the drawing, so that every other composite sheets are connected in parallel to form parallel-connected electrodes. Then, the laminated body becomes as shown in FIG. 1(d). The laminated body is then hot-pressed in a temperature of 280° C. and a pressure of 100 kg/cm² for about 2 min, so that the polyethyleneterephthalate films 1 melts and impregnates the ceramic green layer 2 and the layers 3 to become electrode which are disposed on both surfaces of the polyethyleneterephthalate film 1. Therefore, the ceramic green layers 2 and the layers 3 to become electrode are each other tightly bonded by the melted thermo-plastic film 1, thereby forming laminated body of FIG. 1(e).

Then, the above-mentioned laminated body is fired by raising temperature at a rate of 100° C. per hour to a temperature of 450° C. and kept for 4 hours at 450° C., so that binder, plasticity agent, dispersing agent and the polyethyleneterephthalate resin are all evaporated or oxidized and evaporated. Thereafter, the laminated body is further heated to a sintering temperature of the ceramic material, thereby to form a multilayered ceramic capacitor as shown in FIG. 1(e), wherein the several layers of ceramic green layers are sintered to form a united ceramic body 4, wherein electrodes 3', 3' are provided with a stably disposed gap with the ceramic material filled inbetween.

Thereafter the sides of the electrodes 3', 3' are connected on the left side and the right side by solder or conductive paint 5, 5 for parallel connection of the electrodes 3', 3'.

Figure 2A:
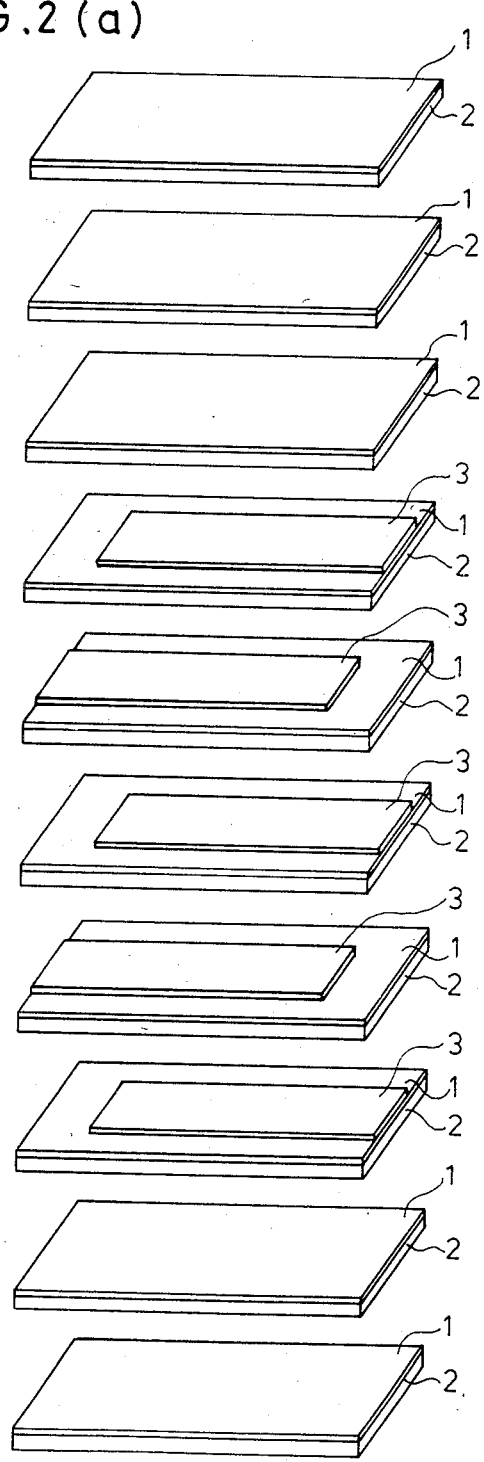
FIG. 2(a) is an exploded perspective view of another capacitor to be manufactured by embodying the present invention.
Figure 2:
FIG. 2(b) and FIG. 2(c) are sectional side views of the component composite sheets for use in making the capacitor of FIG. 2(a).
FIG. 2(d) is a sectional side view of a laminated body of the ceramic green layers made by the component of FIG. 1(a).
FIG. 2(e) is a sectional side view of a completed capacitor manufactured by embodying steps shown in FIGS. 1(a) through 1(d).
Figure 2:
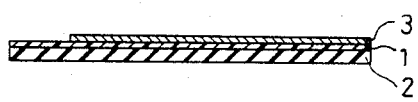
Figure 2:
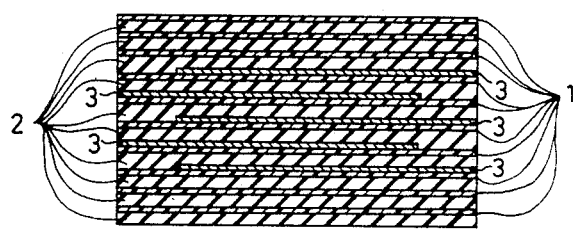
Figure 2:
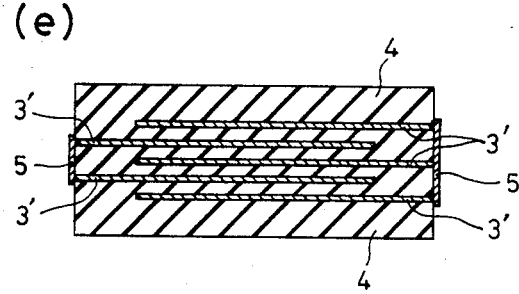

FIG. 2(a), FIG. 2(b), FIG. 2(c), FIG. 2(d) and FIG. 2(e) show another preferred embodiment. In this embodiment, difference from the first embodiment is that a layer 3 to become electrode is formed not on the surface of the ceramic green layer 2. That is, only on one surface of a thermo-plastic film 1, such as polyethyleneterephthalate film of a thickness of about 2 $\mu m$, a ceramic green layer 2 is formed by a known roll-coat method to a thickness of about 10 $\mu m$ as shown in FIG. 2(a). On the other surface of the thermo-plastic film 1, a layer 3 to become electrode is formed by a known printing method, such as gravure printing, by using a conductive ink prepared by dispersing metal powder in a mixed binder containing an inorganic binder and organic binder, thereby to form a three-layer composite sheet shown in FIG. 2(c). Thereafter, the three-layer composite sheet consisting of the thermo-plastic film 1 as substrate and ceramic green layer 2 and a layer 3 to become electrode is dried and laminated in an order as shown in FIG. 2(a), wherein upper three sheets and lower two sheets are two-layer composite sheets shown in FIG. 2(b), and the intermediate five sheets are three-layer composite sheet shown in FIG. 2(c) having the layer 3 to become electrode. The layer 3 to become electrodes are disposed alternatively with its one side extended to the side of the thermo-plastic film 1 and the ceramic green sheet 2 while other three sides are offset with a certain margins from the sides of the thermo-plastic film 1 and the ceramic green layer 2. Thus, the laminated body becomes as shown in FIG. 2(d). The laminated body is then hot-pressed in a temperature of 280° C. and a pressure of 100 kg/cm² for about 2 min, so that the polyethyleneterephthalate films 1 melt and impregnate the ceramic green layer 2 and the layers 3 to become electrode, which are disposed on both surfaces of the polyethyleneterephthalate film 1. Therefore, the ceramic green layers 2 and the layers 3 to become electrode are each other tightly bonded by the melted thermoplastic film 1, thereby forming the tight laminated body.

Then, the above-mentioned laminated body is fired by raising the temperature at a rate of 100° C. per hour to a temperature of 450° C., and kept for 4 hours at 450° C., so that binder, plasticity agent, dispersing agent and the polyethyleneterephthalate resin are all evaporated or oxidized and evaporated. Thereafter, the laminated body is further heated to a sintering temperature of the ceramic material, thereby to form a multilayered ceramic capacitor as shown in FIG. 2(e), wherein the several layers of ceramic green layers are sintered to form a united ceramic body 4, wherein electrodes 3', 3' are provided with a stably disposed gap with the ceramic material filled inbetween.

Thereafter the sides of the electrodes 3', 3' are connected on the left side and the right side by solder or conductive paint 5, 5 for parallel connection of the electrodes 3', 3'.

As is apparent from the above-mentioned embodiments, the manufacturing method in accordance with the present invention can handle the ceramic green layer with keeping the thermo-plastic film as substrate thereunder, and there is no need of peeling off the ceramic green layer from the thermo-plastic film before the lamination. Accordingly, lamination of very thin ceramic green layers become possible, and therefore, multilayered ceramic body comprising very thin ceramic layers, hence for instance, having a very large capacitance per volume can be made.

When a multilayered ceramic body is manufactured in accordance with the above-mentioned method, there is no fear of damaging the ceramic green layers. The present invention enables to manufacture multilayered ceramic body having such thin dielectric layers each having 8 $\mu m$ thickness per layer.

Furthermore, the advantage of the present invention is that, in spite of such thinness of the elementary layer of the dielectric substance between the electrode as is about $\frac{1}{3}$ to $\frac{1}{4}$ of the conventional limit of about 30 $\mu m$ thickness, the production yield of the manufactured multilayered ceramic capacitor is very high. That is, the ceramic capacitors can be manufactured with very low defect rate as shown in the below-mentioned table.

TABLE

| Number of samples | 300 |
| --- | --- |
| Short circuit | 0 |
| Defect of high resistance | 2 |
| Defect of break-down voltage | 1 |

In the above-mentioned test samples, $BaTiO_3$ was used as the dielectric material. The defect of high resistance is defined that product of capacitance and resistance is below 500 F$\Omega$. As the resistance value, resistance at a time after one minute from impressing of a DC voltage of 1000 V/mm. As the capacitance, those measured with a signal of 1 KHz and 1 V is used. The defect of break-down voltage means those which could not hold insulation at impression of DC 250 V.

What is claimed is:

1. Method for making a multilayer ceramic body comprising the step of:
   (a) forming at least a ceramic green layer on an organic films having thermo-plasticity for supporting only the ceramic green layer,
   (b) printing at least one layer to become an electrode layer of a predetermined pattern on a surface opposite to the surface on which said ceramic green layer is formed,
   (c) laminating a plurality of additional organic films similar to said orgainic film, each of said additional organic films having associated therewith another of said ceramic green layers thereon and another of said printed layers to form an electrode, to produce a laminated body, each of said printed layers being disposed between adjacent ceramic green layers in said laminated body,
   (d) hot-pressing said laminated body, thereby melting the organic films to impregnate the melted organic films into said adjacent ceramic green layers and said printed layers to become an electrode thereby directly bonding said ceramic green layers to the adjacent layers to become the electrodes, said hot-pressing being conducted at a temperature of at most 50° C. below the melting point of said organic film, and (e) sintering the laminated body thereby making a multilayer ceramic body having a plurality of electrode layers disposed parallel to each other with predetermined gaps inbetween.

2. The method of claim 1 wherein the thickness of said organic film is within the range of 0.5 μm through of 10 μm.

3. Method for making a multilayer ceramic body comprising the steps of:

(a) forming a ceramic green layer on one surface of an organic film having thermo-plasticity for supporting only the ceramic green layer, (b) printing at least one layer to become an electrode layer of a predetermined pattern on the opposite surface of said organic film, (c) laminating a plurality of said organic films having said ceramic green layer and said layers to become an electrode to produce a laminated body together in alternating layers in a manner such that each of said printed layer to become an electrode are disposed between adjacent ceramic green layers in said laminated body, (d) hot-pressing said laminated body, thereby melting the organic films to impregnate the melted organic films into the ceramic green layers on the layers to become an electrode thereby directly bonding said ceramic green layers to the adjacent layers to become the electrodes, said hot-pressing being conducted at a temperature of at most 50° C. below the melting point of said organic film up to 100° C. above the melting point of said organic film, and (e) sintering the laminated body thereby making a multilayer ceramic body having a plurality of electrode layers disposed parallel to each other with predetermined gaps inbetween.

4. The method of claim 3 wherein the thickness of said organic film is within the range of 0.5 μm through 10 μm.

* * * * *